United States Patent
Chiu

(10) Patent No.: US 10,305,841 B2
(45) Date of Patent: May 28, 2019

(54) SYSTEM AND METHOD OF ENTERPRISE MOBILE MESSAGE

(71) Applicant: MITAKE INFORMATION CORPORATION, Taipei (TW)

(72) Inventor: Hung-Che Chiu, Taipei (TW)

(73) Assignee: MITAKE INFORMATION CORPORATION, Taipei (TW)

( * ) Notice: Subject to any disclaimer, the term of this patent is extended or adjusted under 35 U.S.C. 154(b) by 336 days.

(21) Appl. No.: 14/722,783

(22) Filed: May 27, 2015

(65) Prior Publication Data

US 2016/0248853 A1 Aug. 25, 2016

(30) Foreign Application Priority Data

Feb. 25, 2015 (TW) .............................. 104105999 A

(51) Int. Cl.
| | |
|---|---|
| H04L 12/58 | (2006.01) |
| H04L 29/08 | (2006.01) |
| H04W 4/12 | (2009.01) |
| H04W 4/18 | (2009.01) |
| G06F 21/62 | (2013.01) |

(52) U.S. Cl.
CPC .......... *H04L 51/24* (2013.01); *G06F 21/6218* (2013.01); *H04W 4/12* (2013.01); *H04W 4/18* (2013.01); *G06F 2221/2151* (2013.01); *H04L 67/26* (2013.01)

(58) Field of Classification Search
CPC .......... H04L 51/24; H04L 67/26; H04W 4/18; H04W 4/12; G06F 21/6218; G06F 2221/2151
See application file for complete search history.

(56) References Cited

U.S. PATENT DOCUMENTS

| | | | | |
|---|---|---|---|---|
| 7,587,678 | B1 * | 9/2009 | English ................ | G06Q 10/107 709/206 |
| 8,244,669 | B2 * | 8/2012 | Ellis ..................... | G06Q 10/107 707/609 |
| 8,934,615 | B2 * | 1/2015 | Yasrebi ................ | G06Q 10/107 379/201.01 |
| 9,130,895 | B2 * | 9/2015 | Yasrebi ............... | H04L 41/5064 |

(Continued)

FOREIGN PATENT DOCUMENTS

| | | | |
|---|---|---|---|
| KR | 20160095833 A | * | 8/2016 |
| KR | 20160095833 A | * | 8/2016 |

(Continued)

*Primary Examiner* — Uzma Alam

(74) *Attorney, Agent, or Firm* — Locke Lord LLP; Tim Tingkang Xia, Esq.

(57) ABSTRACT

A system and method of an enterprise mobile message are provided. The system includes a cloud composed of a database, a server, and a push gateway. The server receives an uploaded add subject instruction and a related message to create a new subject block in the database and assigns thereto a subject ID, so as to store the message. The server receives an uploaded reply subject instruction and a related reply message to create a second level block and assigns thereto a second level subject ID, so as to store the reply message. The server delivers the messages and the reply message to the mobile communication device of a corresponding member by a push notification and through the push gateway and an external push host.

36 Claims, 10 Drawing Sheets

(56) References Cited

U.S. PATENT DOCUMENTS

| | | | | |
|---|---|---|---|---|
| 9,509,650 B2* | 11/2016 | Puranik | ............... | H04L 51/16 |
| 9,602,460 B2* | 3/2017 | Bastide | ............... | H04L 51/34 |
| 2002/0087646 A1* | 7/2002 | Hickey | ............... | G06Q 10/10 |
| | | | | 709/206 |
| 2005/0120087 A1* | 6/2005 | Sekiguchi | ............ | H04L 51/066 |
| | | | | 709/206 |
| 2006/0041626 A1* | 2/2006 | Chen | ............... | H04L 51/34 |
| | | | | 709/206 |
| 2007/0174394 A1* | 7/2007 | Jayaweera | ............ | G06Q 10/107 |
| | | | | 709/206 |
| 2009/0198785 A1* | 8/2009 | Uchiyama | ............ | G06Q 10/00 |
| | | | | 709/206 |
| 2009/0228562 A1* | 9/2009 | Uchiyama | ............ | G06Q 10/107 |
| | | | | 709/206 |
| 2009/0313554 A1* | 12/2009 | Haynes | ............ | G06Q 10/107 |
| | | | | 715/752 |
| 2010/0313250 A1* | 12/2010 | Chow | ............... | H04L 63/08 |
| | | | | 726/5 |
| 2011/0078769 A1* | 3/2011 | Tsubaki | ............... | G06F 16/10 |
| | | | | 726/4 |
| 2012/0209931 A1* | 8/2012 | Antell | ............... | H04H 60/33 |
| | | | | 709/206 |
| 2013/0227045 A1* | 8/2013 | Ehrlich | ............... | H04L 63/1441 |
| | | | | 709/206 |
| 2014/0244734 A1* | 8/2014 | Nutt | ............... | H04L 51/046 |
| | | | | 709/203 |
| 2014/0344382 A1* | 11/2014 | Schmid | ............... | G06Q 10/107 |
| | | | | 709/206 |
| 2015/0052058 A1* | 2/2015 | McCown | ............... | G06Q 50/22 |
| | | | | 705/51 |
| 2015/0074154 A1* | 3/2015 | Fernandez Gutierrez | ............... | |
| | | | | G06F 21/6218 |
| | | | | 707/805 |
| 2015/0200897 A1* | 7/2015 | Otus | ............... | H04L 51/22 |
| | | | | 709/206 |

FOREIGN PATENT DOCUMENTS

| | | | | |
|---|---|---|---|---|
| WO | WO 2005026913 A2 * | 3/2005 | ............ | G06Q 10/107 |
| WO | WO-2005026913 A2 * | 3/2005 | ............ | G06Q 10/107 |

* cited by examiner

SYSTEM AND METHOD OF ENTERPRISE MOBILE MESSAGE

BACKGROUND OF THE INVENTION

Field of the Invention

The present invention relates to cloud technology applicable to mobile communication devices, and more particularly, to a system and method of an enterprise mobile message.

Description of the Prior Art

Mobile communication devices nowadays are often adapted to function as message exchange systems by cloud technology and provided to societies and organizations, but conventional mobile message delivery technology still has too many drawbacks to meet the needs for corporate governance.

Taiwan's Published Patent Application 201312971 (hereinafter referred to as "citation 1"), entitled "Method of Receiving Message", discloses a method of receiving messages. The method is applicable to electronic devices. The method comprises the steps of: receiving a message; getting connected to a server according to the IP established in an electronic device upon the receipt of the message; retrieving a multimedia file from the server; and downloading and playing the multimedia file. The technical problem to be solved by citation 1 is as follows: the frame for displaying a short message is primitive, because the frame merely displays the contents of the short message and provides simple operation functions, such as editing short messages. Users who often keep in touch with each other by short messages not only attach great importance to prompts but also regard a robust short message interface important" (see citation 1, the specification, paragraph [0002]). The technical effect produced by citation 1 is "downloading multimedia files through messages."

Taiwan Patent 573268, entitled "Channel Subscription, Push System, and Method Thereof" (hereinafter referred to as "citation 2"), discloses channel subscription, a push system, and a method thereof, wherein a user connects a mobile communication device to a WML server so as to subscribe to a channel. The WML server produces a subscription list and assigns code SS DTD to the subscription list. A SQL server not only receives and stores SSDTD but also determines whether information pertaining to the channel has been updated in accordance with SS DTD. If the determination is affirmative, the SQL server sends an update message to a push server, such that the push server receives the update message and pushes the update message to the mobile communication device. The mobile communication device receives the update message, and then the user connects the mobile communication device to the WML server in accordance with the update message, so as to download the latest information. The technical problems to be solved by citation 2 are as follows: "1. the user must take the initiative in making an inquiry to check whether the previously subscribed information has been updated, and in consequence the user cannot be informed of the latest message in a real-time manner; 2. the information received by the user is seldom categorized, organized, or managed, and in consequence it is not reader-friendly; and 3. In general, although the subscribed information is received by the mobile communication device, it cannot be categorized, organized, or managed, thereby precluding the user from subscribing to multiple messages" (see citation 2, the specification, Background of the Invention, last paragraph). The technical effect produced by citation 2 is as follows: as soon as information of a channel is updated, a user is informed of the update by push technology so that the user can learn about the latest information instantly; and the channel-related information received by the user is categorized, organized, and managed, such that the user can read it easily."

Taiwan Patent 1359600 (hereinafter referred to as "citation 3"), entitled "Method and System of Subscribing to Mobile Channel Having Delivered Content", discloses a method and system of creating a delivered content for channel subscription in a mobile network, comprising the steps of: creating a subscription from a content provider and a mobile apparatus in the mobile network; and delivering a delivered content to a delivery server. The technical problem to be solved by citation 3 is as follows: " . . . the other alternatives include push and broadcast or community broadcast which complies with SMS; in case of broadcast, it is impossible to standardize delivery in order to meet the requirement of the capability of a specific apparatus or a specific user; therefore the systems do not have intelligence associated with them" (see citation 3, the specification, paragraph [0005]). The technical effect produced by citation 3 is as follows: provide a subscription model and topology, wherein both subscribed information and a delivered content are sent to a delivery server or a content provider.

Citation 4 is directed to providing message exchange service in a person-to-person manner or within an organization by a cloud, a mobile communication device, and push technology, as well as, for example, "Line" application and a back-end system thereof developed by Japan-based LINE Corporation, a subsidiary of South Korea-based NHN, and "WhatsApp" application of Facebook and a back-end system thereof. The technical problem to be solved by citation 4 is as follows: message contents sent through conventional short messages are not diverse enough to bridge the gap of communication vividly and flexibly. The technical effect produced by citation 4 is as follows: providing message exchange (chat room) service in a person-to-person manner or within an organization and rendering message pictures more vivid and flexible.

According to the aforesaid citations, none of the servers of the cloud is equipped with a subject management module to meet the need for "separately recording messages of different subjects even if the subjects are discussed by the same participants." For example, multiple members of a specific group in a company take part in various projects simultaneously, but different project discussion messages cannot be separately recorded due to lack of a subject management module in the prior art, and in consequence all the different project discussion messages are recorded so miscellaneous that the project discussion messages are difficult to distinguish or search for later. The chat room of citation 4 (Line and WhatsApp) requires distinguishing different records by "participant member" (i.e., member-oriented), wherein, when the participant members are the same, the records follow a preceding record. Assuming that "member A", "member B" and "member C" create a chat room for discussing two different subjects of "project A" and "project B" according to citation 4, then "member A", "member B" and "member C" use the same chat room (because the participant members remain unchanged) whenever they are about to discuss different subjects; hence, the chat records (i.e., messages) of "project A" and "project B" are always mixed together.

Accordingly, it is necessary to provide a cloud system and method of an enterprise mobile message and a mobile communication device for use in accessing the cloud, to store messages in separate blocks in a database in accordance with subjects (i.e., subject-oriented), respectively, and provide a graphical user interface disposed at a client end and adapted to check separate subject block messages, thereby enhancing users' working efficiency.

SUMMARY OF THE INVENTION

In view of the aforesaid drawbacks of the prior art, the present invention provides a system and method of an enterprise mobile message to store messages in separate blocks in accordance with subjects, respectively, and provide a graphical user interface disposed at a client end and adapted to check separate subject block messages.

The present invention provides a system of an enterprise mobile message, comprising: a database for storing therein a plurality of subject blocks and a plurality of member information sets, wherein the subject blocks each comprises a subject ID and a primary message associated with the subject ID; a server for accessing the database, comprising: a first network communication module for establishing a network connection with a mobile communication device associated with one of the member information sets; a login verification module for verifying the mobile communication device connects to the server through the network; and a subject management module for receiving a reply message and a reply subject instruction associated with the subject ID and uploaded from the mobile communication device, wherein the reply message is stored in the subject block corresponding to the subject ID, and the reply message is associated with the primary message; and a push gateway for creating a push notification in accordance with the primary message or the reply message and sending the push notification to the mobile communication device corresponding to the associated member information sets through an external push host, wherein a cloud comprises the database, the server, and the push gateway.

Regarding the system of the present invention, preferably, the server comprises a reading record management module for creating a read list or an unread list associated with the member information sets in accordance with a read/unread information set associated with the primary message or the reply message.

Regarding the system of the present invention, preferably, the read/unread information set requires recording the association between the member information sets and a read/unread state of the primary message or the reply message.

Regarding the system of the present invention, preferably, the mobile communication device comprises one or more processors and a screen, wherein the processor executes a plurality of program instructions, the program instructions comprising: a first program instruction for instructing the mobile communication device to establish a network connection with the server and thereby undergo login verification; a second program instruction for instructing the mobile communication device to download a message content of the primary message corresponding to a push notification serial number from the server after receiving the push notification; a third program instruction for instructing the mobile communication device to display messages according to the subject ID and display the primary message associated with the subject ID on the screen; and a fourth program instruction for instructing the mobile communication device to receive input of the reply message, generate the reply subject instruction associated with the subject ID, and upload the reply message and the reply subject instruction to the server.

Regarding the system of the present invention, preferably, the third program instruction instructs the mobile communication device to download and display an unread list in response to an unread list query instruction.

Regarding the system of the present invention, preferably, the third program instruction instructs the mobile communication device to upload a read state in response to a reading instruction of the primary message.

Regarding the system of the present invention, preferably, the third program instruction instructs the mobile communication device to download and display a read list in response to a read list query instruction of the primary message.

Regarding the system of the present invention, preferably, the third program instruction instructs the mobile communication device to display a timestamp corresponding to the member information sets while displaying the unread list.

Regarding the system of the present invention, preferably, the timestamp is a "date and time of the latest login to the system" or a "date and time of the latest entry into the chat room."

Regarding the system of the present invention, preferably, a one-time data access is performed to thereby load the database with all the primary messages and reply messages within the subject blocks.

Regarding the system of the present invention, preferably, the subject blocks each comprises a recipient list associated with the member information sets.

Regarding the system of the present invention, preferably, the reply subject instruction comprises the recipient list.

Regarding the system of the present invention, preferably, the subject management module overwrites the recipient list of the subject block with the recipient list of the reply subject instruction.

Regarding the system of the present invention, preferably, the server comprises a first message module for creating a recipient push list in accordance with the recipient list, wherein the recipient push list comprises at least one push ID associated with the mobile communication device.

Regarding the system of the present invention, preferably, the subject management module receives the primary message and an add subject instruction uploaded from the mobile communication device and creates a new subject block in the database.

Regarding the system of the present invention, preferably, the add subject instruction comprises a recipient list, wherein the subject management module provides the subject ID and the recipient list to thereby store the primary message in the subject block.

Regarding the system of the present invention, preferably, in response to the reply subject instruction, the subject management module creates a second level block within the subject block and provides a subject second level ID for use in storing the reply message.

The present invention further provides a system of an enterprise mobile message, comprising: a database for storing therein a plurality of subject blocks and a plurality of member information sets, wherein the subject blocks each comprises a subject ID, a primary message associated with the subject ID, and at least one read/unread information set, wherein the read/unread information set requires recording the association between the member information set and a read/unread state of the primary message; a server for accessing the database, comprising: a first network communication module for establishing a network connection with a mobile communication device associated with one of the member information sets; a subject management module for receiving the primary message and an add subject instruction uploaded from the mobile communication device, wherein the subject blocks are created in the database and provided with the subject ID, and the primary message is stored in the subject block; and a reading record management module for comparing the member information sets in accordance with the read/unread information set to thereby create a read list or an unread list; and a push gateway for creating a push notification in accordance with the primary message and sending the push notification to the mobile communication device corresponding to the associated member information sets through an external push host, wherein a cloud comprises the database, the server, and the push gateway.

Regarding the system of the present invention, preferably, the mobile communication device comprises one or more processors and a screen, wherein the processor executes a plurality of program instructions, the program instructions comprising: a first program instruction for instructing the mobile communication device to download the primary message corresponding to a push notification serial number from the server after receiving the push notification; and a second program instruction for instructing the mobile communication device to display messages according to the subject ID, display the primary message associated with the subject ID on the screen, and download and display the unread list in response to an unread list query instruction, or download and display the read list in response to a read list query instruction; and a third program instruction for instructing the mobile communication device to receive the primary message input, generate the add subject instruction, and upload the primary message and the add subject instruction to the server.

The present invention further provides a method of an enterprise mobile message, applicable to a cloud comprising a database, a server, and a push gateway. The method comprises the steps of: storing a plurality of subject blocks and a plurality of member information sets in the database, wherein the subject blocks each comprises a subject ID and a primary message associated with the subject ID; establishing a network connection between the server and a mobile communication device associated with one of the member information sets, so as for the mobile communication device to undergo login verification; receiving by the server a reply message and a reply subject instruction associated with the subject ID and uploaded from the mobile communication device, storing the reply message in the subject block, and associating the reply message with the primary message; and creating a push notification by the push gateway in accordance with the primary message or the reply message and sending the push notification to the mobile communication device through a push host.

Regarding the method of the present invention, preferably, the mobile communication device comprises one or more processors and a screen, wherein the processor executes a plurality of program instructions, the program instructions comprising: a first program instruction for instructing the mobile communication device to establish a network connection with the server and thereby undergo login verification; a second program instruction for instructing the mobile communication device to download the reply message or the primary message corresponding to a push notification serial number from the server after receiving the push notification; a third program instruction for instructing the mobile communication device to display messages according to the subject ID and display the reply message or the primary message associated with the subject ID on the screen; and a fourth program instruction for instructing the mobile communication device to receive input of the reply message, generate the reply subject instruction associated with the subject ID, and upload the reply message and the reply subject instruction to the server.

The present invention further provides a method of an enterprise mobile message, applicable to a mobile communication device for use in accessing a cloud. The cloud comprises a database, a server, and a push gateway. The database stores therein a plurality of subject blocks and a plurality of member information sets, wherein the subject blocks each comprises a subject ID and a primary message associated with the subject ID. The mobile communication device comprises one or more processors and a screen. The processor executes a plurality of program instructions. The program instructions comprise: a first program instruction for instructing the mobile communication device to establish a network connection with the server and thereby undergo login verification; a second program instruction for instructing the mobile communication device to download the primary message of the subject block from the server according to a push notification; a third program instruction for instructing the mobile communication device to display messages according to the subject ID and display the primary message associated with the subject ID on the screen; and a fourth program instruction for instructing the mobile communication device to receive input of a reply message, generate a reply subject instruction associated with the subject ID, and upload the reply message and the reply subject instruction to the server, wherein the server associates the reply message with the primary message within the subject block according to the reply subject instruction.

The present invention further provides a method of an enterprise mobile message, applicable to a mobile communication device for use in accessing a cloud. The cloud comprises a database, a server, and a push gateway. The database stores therein a plurality of subject blocks and a plurality of member information sets, wherein the subject blocks each comprises a subject ID, a primary message associated with the subject ID, and at least one read/unread information set, wherein the read/unread information set requires recording the association between the member information set and a read/unread state of the primary message. The mobile communication device comprises one or more processors and a screen. The processor executes a plurality of program instructions. The program instructions comprise: a first program instruction for instructing the mobile communication device to establish a network connection with the server and thereby undergo login verification; a second program instruction for instructing the mobile communication device to receive the primary message input, generate an add subject instruction, and upload the primary message and the add subject instruction to the server; and a third program instruction for instructing the mobile communication device to download and display an unread list in response to an unread list query instruction or download and display a read list in response to a read list query instruction, wherein the unread list or the read list is created in accordance with a comparison of the read/unread information set and the member information sets.

The embodiments below describe the features and advantages of the present invention in detail, and its contents is sufficient to allow any person skilled in the art to understand the technical contents of the present invention and implement it accordingly. The disclosure of the specification, claims, and drawings enables any person skilled in the art to understand the objectives and advantages of the present invention easily.

DETAILED DESCRIPTION OF THE EMBODIMENTS

In an embodiment of the present invention, enterprise mobile messages, such as important corporate notices, are for use with a bulletin board message of a mobile bulletin board and convey from top to bottom (i.e., from a managing director to the staff of the organization). In an embodiment of the present invention, enterprise mobile messages are for use with a chat message of a mobile chat room when, for example, all the members of a department attend a multi-user online conference with a chat room and send the chat messages to each other. In an embodiment of the present invention, enterprise mobile messages are for use with articles of mobile timeline news (also known as news feed) when, for example, a department member sends an article to his or her department colleague.

Figure 1:
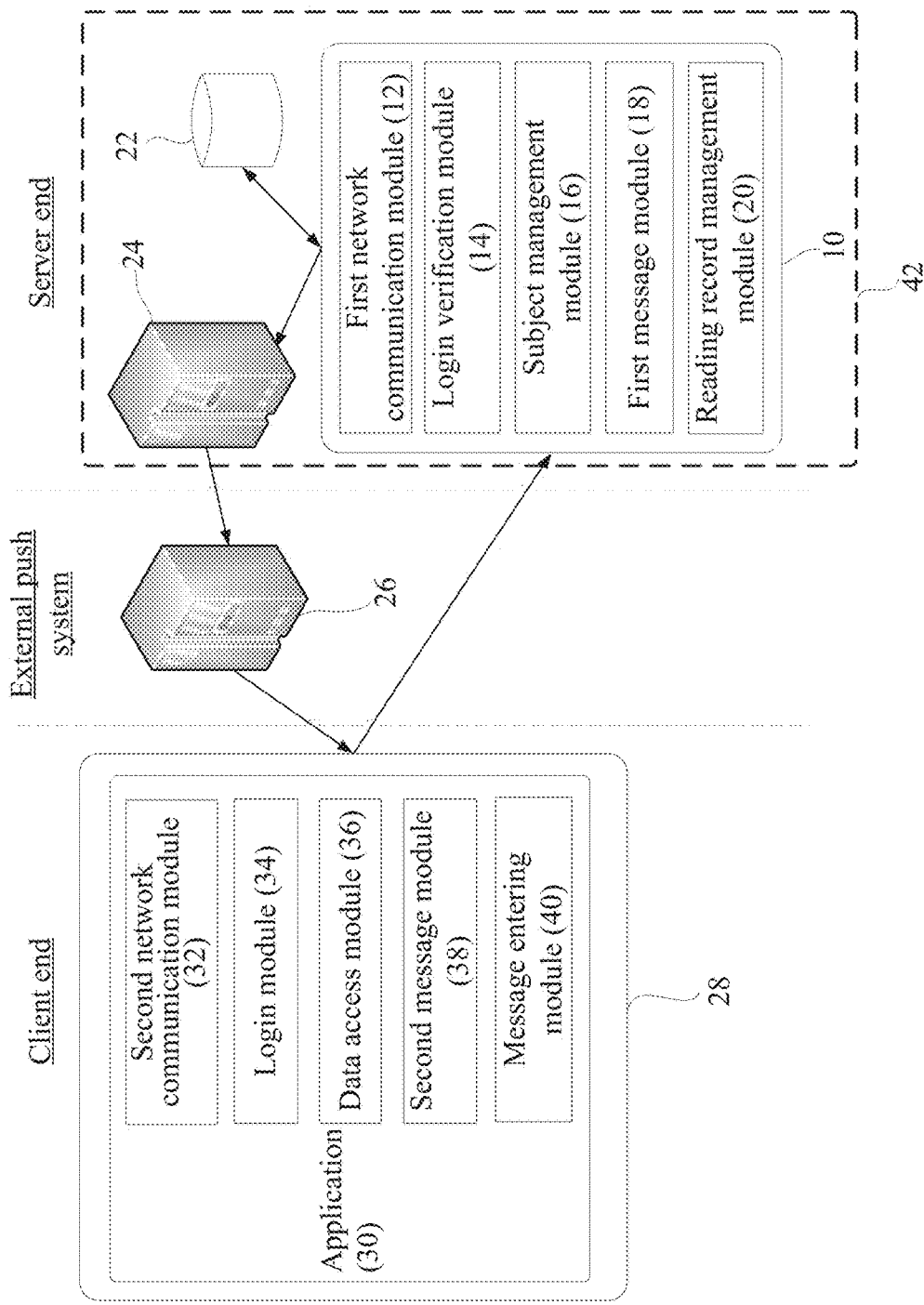
FIG. 1 is a schematic view of the system architecture according to an embodiment of the present invention.

Referring to FIG. 1, there is shown a schematic view of the system architecture according to a preferred embodiment of the present invention. The system of the present invention comprises a database 22, a server 10 and a push gateway 24 at a server end (i.e., a cloud 42), and a mobile communication device 28 at a client end. The server end sends push notification to the client end via an external push system; however, the external push system is illustrative rather than restrictive of the system of the present invention. The database 22 stores therein a plurality of subject blocks and a plurality of member information sets. The subject blocks each comprises at least one primary message, a recipient list (i.e., a receiver of a message), a subject ID, and a read/unread information set. According to the present invention, a reply message and the at least one primary message associated with the subject ID are stored in different subject blocks according to their respective subjects. The subject blocks are provided with unique subject ID. The "subject" does not mean a "topic" or "heading" of a message but means a new subject created as a result when a user enters a new message (primary message) with an "add subject instruction", for example, by clicking on a "create new message button". Hence, the user creates subjects for use with projects, respectively, to distinguish all the discussion messages, wherein the messages each comprises a message content, and the member information sets each comprises an account (e.g., digits, letters, or a combination of digits, letters and notations, such as email) and password. In this regard, the read/unread information set refers to a member list associated with the members who have read or not read the message content of the primary message, that is, "all the read members who have read message contents of primary messages" or "all the unread members who have not read message contents of primary messages." Hence, the read/unread information set requires recording the association between the member information set and a read/unread state of the primary message. For example, after a specific primary message has ever been read by 10 members, the read/unread information set keep a record of the 10 read members or keep a record of unread members among all the members who have received the primary message. The primary messages in the database 22 carry the read/unread information set, respectively. The read information set is updated as soon as a read state of the mobile communication device 28 of the member is uploaded.

According to the present invention, the subject blocks are characterized in that: for data to be stored in a memory, associated data (i.e., the primary message and the reply message of the same subject, including all the sub-level blocks: the second level block, the third level block, and so forth) are stored physically at adjacent locations (i.e., "sectors") in the database 22; hence, for the database 22 to be loaded, a one-time I/O access (i.e., I/O disk access which is an data access achieved by the hard disk magnetic heads read/write data when the disk platter rotates one time) occurs to thereby load the entire data within the subject blocks (including all the sub-level blocks), so as to not only reduce the number of conventional I/O accesses greatly but also enhance the performance of the database 22. The prior art fails to store associated data in adjacent sectors and thus necessitates multiple I/O accesses in order to read all the associated data distributed among the sectors.

The server 10 comprises one or more processors and implements through the coordinated operation of hardware and software the modules as follows: a first network communication module 12, a login verification module 14, a subject management module 16, a first message module 18, and a reading record management module 20. The first network communication module 12 establishes a network connection with a second network communication module 32 of the mobile communication device 28 at the client end. In various embodiments of the present invention, the network connection complies with TCP protocol (including Socket and WebSocket connection), HTTP protocol, or HTTPS protocol. The login verification module 14 verifies whether the mobile communication device 28 has connected with the server 10 through the network, receives the account and password uploaded from a specific member through the mobile communication device 28, and verifies the account and password by comparing them with the account and password attributed to the member information set stored in the database 22. The subject management module 16 receives the uploaded add subject instruction and primary message (which are correlated), creates a subject block in the database 22, provides a subject ID, and stores the primary message. Since the add subject instruction comprises the recipient list (i.e., the message receiver), the subject management module 16 provides the subject block with the same recipient list in accordance with the recipient list in the add subject instruction and receives the uploaded reply message and reply subject instruction (which are correlated) associated with the subject ID so as to create a second level block in the subject block corresponding to the subject ID and provide a subject second level ID for storing the reply message and associating the reply message with the primary message. The first message module 18 creates a recipient push list in accordance with the recipient list. The recipient push list comprises at least one push ID associated with the mobile communication device 28. The push ID corresponds to a member's receiving device (i.e., the mobile communication device 28). To configure the receiver (i.e., the recipient list) of a message, it is usually to select a member in an organization directory by ticking a member from an organization directory (e.g., organization address book, organization contact list). The first message module 18 must undergo mapping in order to convert the receiver (i.e., "the selected member in the organization directory") into a recipient push list (i.e., the "push ID" of the selected member). The reading record management module 20 records "the read state of a specific primary message" uploaded from the mobile communication device 28 in the read information set of the database 22 in accordance with the user (i.e., the member). The reading record management module 20 creates the read list associated with the member information set in accordance with the read information set of the primary message when the user uploads the "read list query instruction regarding a specific primary message." The reading record management module 20 compares the member information set (the receivers of the initial message, that is, the recipient list or recipient push list) with the read information set of the primary message to thereby create the unread list associated with the member information set when the user uploads the "unread list query instruction regarding a specific primary message." For example, initially, 30 members are the receivers of a specific primary message, but the read information set records 10 members; hence, the reading record management module 20 creates the unread list by comparing the read information set with the initial receivers (the recipient list or recipient push list).

In an embodiment of the present invention, the recipient list of the subject block is configured in accordance with the recipient list (i.e., message receivers) included in the add subject instruction when a new subject block is created in the database 22. Hence, members (message receivers) for receiving all the associated messages (i.e., primary messages and reply messages) in a subject block subsequently are configured as soon as the block is created. In another embodiment of the present invention, the reply subject instruction comprises the recipient list (configured by a message entering module 40) such that the subject management module 16 overwrites the recipient list of the subject block with the recipient list of the reply subject instruction when the reply subject instruction comprises the recipient list. For example, initially, receivers (i.e., the recipient lists) of messages (primary messages and reply messages) of a specific subject are restricted to member A, member B, and member C; however, subsequently, member B adds a discussion participant member D to the reply message (i.e., stored in the second level block) such that member A, member B, member C, and member D receive the push notification and participate in the discussion whenever any reply message is stored in the subject block again.

In an embodiment of the present invention, all the modules of the server 10 are deemed resources for use in the coordinated operation of hardware and software, and the technical features of each of the modules can be expressed by a plurality of program instructions or a portion of an application, provided that the technical effect of each module is attained in the form (i.e., resources for use in the coordinated operation of hardware and software) of execution of the program instructions or the portion of the application by one or more processors. The problems to be solved by the present invention are alleviated through the resources for use in the coordinated operation of hardware and software.

The server 10 and the database 22 are not necessarily disposed on a specific number of apparatuses. In various embodiments of the present invention, both the server 10 and the database 22 are disposed on the same apparatus, on cluster-structured apparatuses, respectively, or on differently-located cluster-structured apparatuses, respectively.

The push gateway 24 creates a push notification in accordance with the primary message or the reply message and sends the push notification to the mobile communication device 28 corresponding to the recipient push list through an external push host 26 (such as MPNS, GCM, and APNS). In an embodiment of the present invention, the push notification of the primary message or the reply message comprises the partial or full message content and the push ID on the recipient push list, whereas the push notification comprises a push notification serial number which is unique (or at least is not duplicate within a searchable recent range of data). In an embodiment of the present invention, the partial or full message content of a push notification depends on the length of the message content. Take APNS as an example, since it allows a maximum of 256 bytes of message content (payload), its push notification comprises the full content of a specific message when the message has less than 256 bytes of content but comprises the partial content (i.e., the first 256 bytes of content) of a specific message when the message has more than 256 bytes of content. In another embodiment of the present invention, messages (including primary messages and reply messages) each comprise a message topic whose push notification is sent with the message topic.

In various embodiments of the present invention, the mobile communication device 28 is a smartphone or tablet running iOS, Android or Windows Phone operation system. The mobile communication device 28 comprises one or more processors and a screen. The processor executes a plurality of program instructions or an application (App) 30. The resources for use in executing the application 30 by the processor comprises the second network communication module 32, a login module 34, a data access module 36, a second message module 38, and the message entering module 40. The second network communication module 32 establishes a network connection with the first network communication module 12 of the server 10. In various embodiments of the present invention, the network connection complies with TCP protocol, HTTP protocol, or HTTPS protocol. The login module 34 receives an account and password entered by the user (i.e., member) through an input interface of the mobile communication device 28 and uploads the account and password to the server 10 to undergo verification. In another embodiment of the present invention, the account and password are stored temporarily in a memory of the mobile communication device 28 such that, within a specific period (e.g., a day or a week), the user can effectuate every instance of login automatically, without entering the account and password manually. After the data access module 36 receives the push notification, the second network communication module 32 is triggered to establish a network connection (TCP protocol, HTTP protocol or HTTPS protocol) with the first network communication module 12 of the server 10, and full contents of the reply message or the primary message corresponding to the push notification serial number are downloaded from the server 10. In an embodiment of the present invention, a network connection established between the second network communication module 32 and the first network communication module 12 complies with TCP protocol or WebSocket protocol (which is a type of TCP protocol, but a handshake request sent from the client end is in the form of HTTP), wherein the data access module 36 downloads a message directly. In another embodiment of the present invention, the network connection established between the second network communication module 32 and the first network communication module 12 complies with HTTP protocol or HTTPS protocol, wherein the data access module 36 downloads a message by polling. The second message module 38 displays messages according to the subject ID and displays messages associated with the subject ID on the screen. Hence, according to the present invention, different subjects are separately displayed on the screen, whereas the primary message and reply message associated with the same subject are displayed together, such that the user can distinguish between subjects when reading and/or searching for the primary message and reply message. The concepts of receiving "a message reading instruction" and uploading "the read state" mean that the second message module 38 uploads "the read state" (i.e., the user has read the information set of the primary message) to the server 10 as soon as the user reads a specific primary message (which generates a reading instruction). The concept of receiving "the read list query instruction of messages" to download and display the read list means that the second message module 38 uploads the "read list query instruction" and then downloads the read list regarding the primary message and displays the read list on screen as soon as the user issues "the read list query instruction" (for example, by clicking on a "read" button) with respect to a specific primary message. The concept of receiving "the unread list query instruction of messages" to download and display the unread list means that the second message module 38 uploads an "unread list query instruction", downloads the unread list regarding the primary message, and displays the unread list on the screen as soon as the user issues the "unread list query instruction" (for example, by clicking on an "unread" button) with respect to a specific primary message.

The processor executes a plurality of program instructions which comprise a first program instruction, a second program instruction, a third program instruction, a fourth program instruction, and a fifth program instruction. The first program instruction instructs the mobile communication device 28 to establish a network connection with the server 10 and thereby undergo login verification. The second program instruction instructs the mobile communication device 28 to download a message content of the reply message or the primary message corresponding to the push notification serial number from the server 10 after the mobile communication device 28 receives the push notification. The third program instruction instructs the mobile communication device 28 to display messages according to the subject ID, display the reply message or the primary message associated with the subject ID on the screen, and download and display an unread list in response to an unread list query instruction, or upload the read state in response to a reading instruction of the primary message, or download and display the read list in response to a read list query instruction of the primary message. The fourth program instruction instructs the mobile communication device 28 to receive input of the reply message, generate the reply subject instruction associated with the subject ID, and upload the reply message and the reply subject instruction to the server 10, wherein the reply message comprises a message content. The fifth program instruction instructs the mobile communication device to receive the primary message input, generate an add subject instruction, and upload the primary message and the add subject instruction to the server.

In various embodiments of the present invention, the first through fifth program instructions executed by the processor are illustrative of a plurality of program instructions of the present invention rather than restrictive of their respective technical features or respective steps of the process flow of the method of the present invention. Persons skilled in the art understand that the respective technical features or respective steps of the process flow of the method with respect to the first through fifth program instructions can be combined in a manner to be expressed by different combinations of program instructions.

As mentioned before, the primary message and reply message of the present invention are for use with a bulletin board, a chat room, or timeline news. When the primary message and reply message are for use with a bulletin board and timeline news, all message-receiving members (i.e., all the members listed on the recipient push list) have the authority to check the read list and unread list displayed by the second message module 38. When the primary message and reply message are for use with a multi-person chat room, only message senders and administrators have the authority to check the read list and unread list displayed by the second message module 38.

In another embodiment of the present invention, the mobile communication device 28 for executing the application 30 further comprises the message entering module 40. The message entering module 40 receives a member instruction for entering a new message (primary message) or reply message. The entry of the new message (primary message) brings about the generation of the add subject instruction (for example, by clicking on the "create new message button"), whereas the entry of the reply message brings about the generation of the reply subject instruction (for example, by clicking on the "reply message button"). The add subject instruction comprises the recipient list (i.e., receiver). The recipient list is to select a specific member from a directory (such as an organization directory or a personal directory) by ticking. Afterward, the message entering module 40 uploads the primary/reply message and the add/reply subject instruction to the server 10 through the second network communication module 32.

Figure 2:
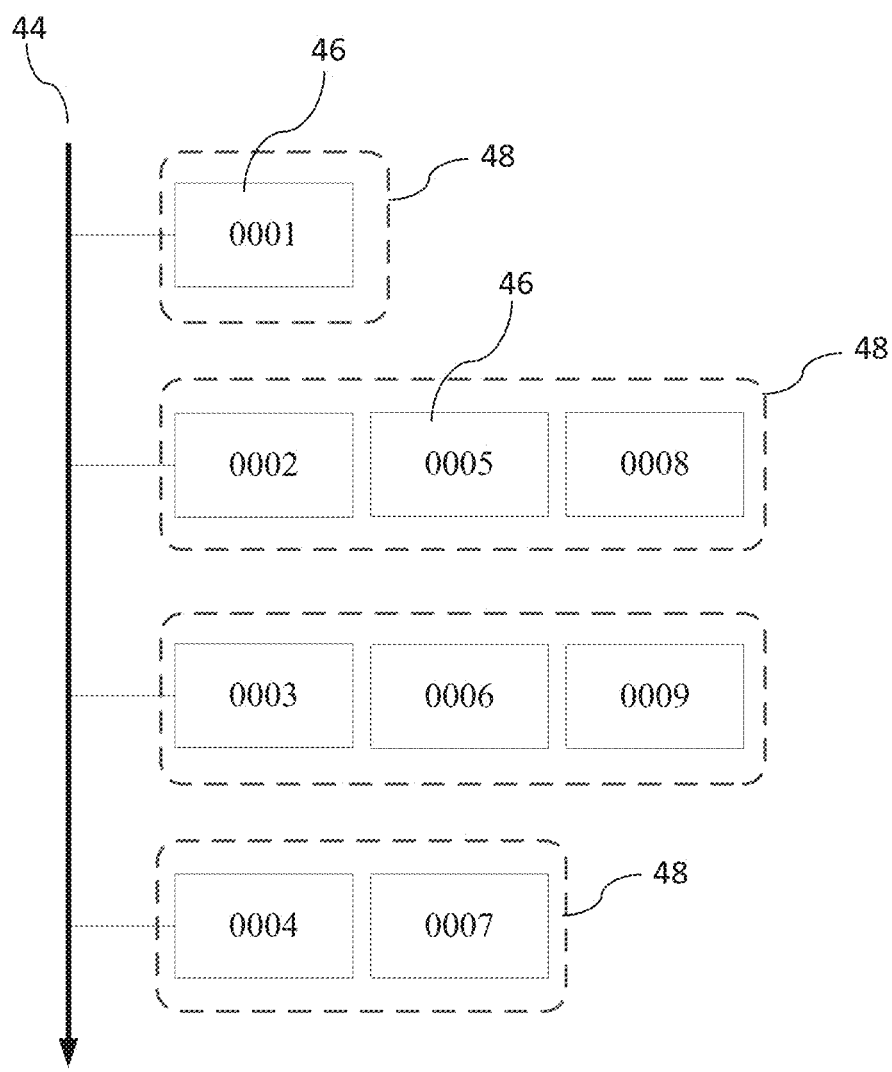
FIG. 2 is a schematic view of subject blocks according to an embodiment of the present invention.

Referring to FIG. 2, there is shown a schematic view of subject blocks 48 according to an embodiment of the present invention. According to the present invention, the enterprise mobile message is for use with a bulletin board, a chat room, or a timeline news 44. FIG. 2 illustrates one of the embodiments of the present invention. The subject blocks of the chat room and the bulletin board are the same as those shown in FIG. 2 and thus are not reiterated herein. Referring to FIG. 2, according to the present invention, in the situation where the database 22 is for use with the timeline news 44, the primary message and reply message are stored in a container 46. The container 46 is configured in a manner that its contents are data in whatever formats, such as text, video, audio, graphic, picture, URL, streaming, e-voting, etc., wherein, as shown in FIG. 2, the numbers in the container 46 denote ID. Numbers "0001", "0002", "0003" and "0004" in the container 46 each denotes the primary message (created in the database 22 by the server according to an add subject instruction) in each subject block 48, wherein the numbers each denotes the subject ID of each subject block 48 as well. Numbers "0005", "0006", "0007", "0008" and "0009" in the container 46 each denotes the reply message (created in the subject block 48 by the server according to a reply subject instruction associated with the subject ID) in each subject block 48, wherein numbers "0005", "0006" and "0007" each denotes "subject second level ID", and numbers "0008" and "0009" each denotes "subject third level ID" and so forth. The numbers (ID) are further used by the database 22 to denote addresses where the primary message and/or reply message are stored; for example, a data stored complete address of number "0009" is "0003.0006.0009". According to the present invention, the primary messages and reply messages of different subjects are stored in the subject block 48 to allow the user to conveniently search for and browse past discussions (i.e., primary messages and reply messages) by subject. In order for the database 22 to load data, a one-time I/O access is carried out to thereby load all the data in the subject block 48, so as to reduce the number of I/O accesses greatly and enhance the performance of the database 22.

Figure 3:
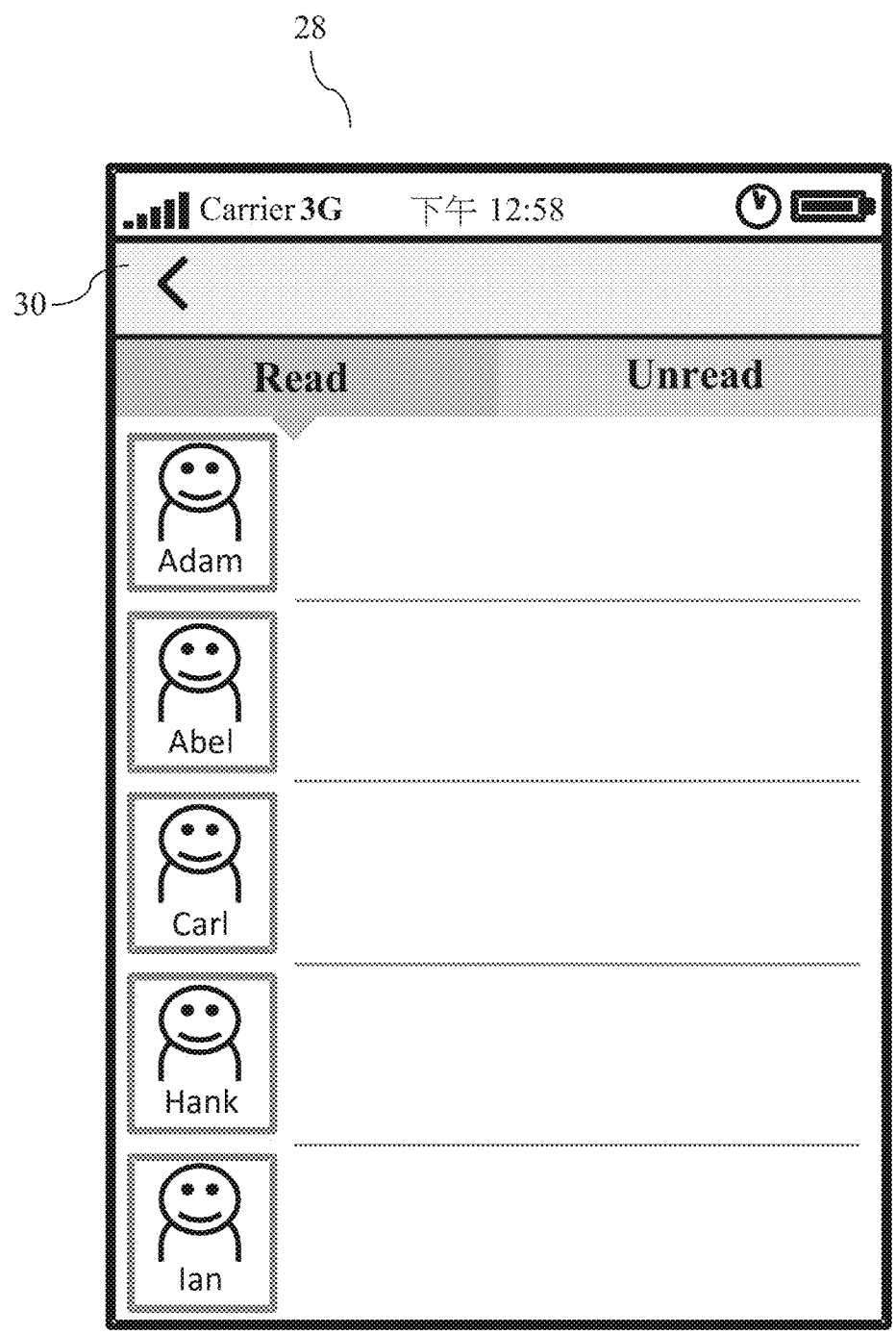
FIG. 3 is a schematic view of a mobile communication device displaying a read list according to an embodiment of the present invention.

Referring to FIG. 3, there is shown a schematic view of the mobile communication device 28 displaying a read list according to an embodiment of the present invention. As shown in the diagram, in an embodiment of the present invention, after the mobile communication device 28 executes the application 30, the user searches the read list for a specific message (such as a bulletin board message, a chat message, or an article). The diagram shows that members who have read the message include "Adam", "Abel", "Carl", "Hank", and "Ian". In this embodiment of the present invention, the read list and the unread list are displayed by tabs, respectively. In another embodiment of the present invention, the user clicks on a button (not shown) or a page (not shown) in order to display the read list and the unread list.

Figure 4:
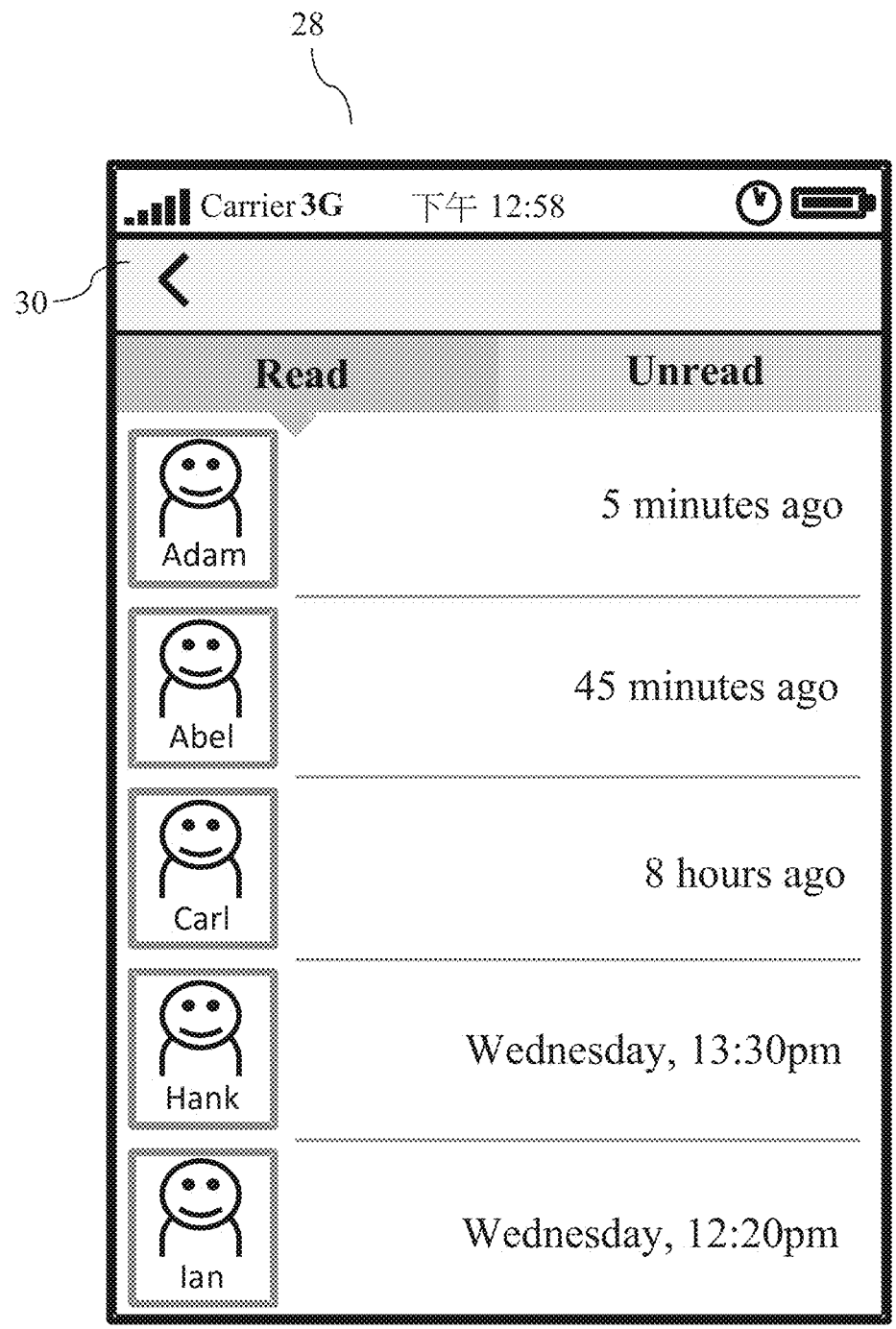
FIG. 4 is a schematic view of the mobile communication device displaying the read list according to another embodiment of the present invention.

Referring to FIG. 4, there is shown a schematic view of the mobile communication device 28 displaying the read list according to another embodiment of the present invention. Unlike the previous embodiment (FIG. 2), this embodiment features a "reading timestamp", wherein the reading time is the time at which a member reads a message, for example, "Adam had read 5 minutes ago", "Carl had read 8 hours ago", and "Ian had read at 12:20 pm last Wednesday". The reading timestamp is presented in the format of some day in some month if the member had read the message more than a week ago.

Figure 5:
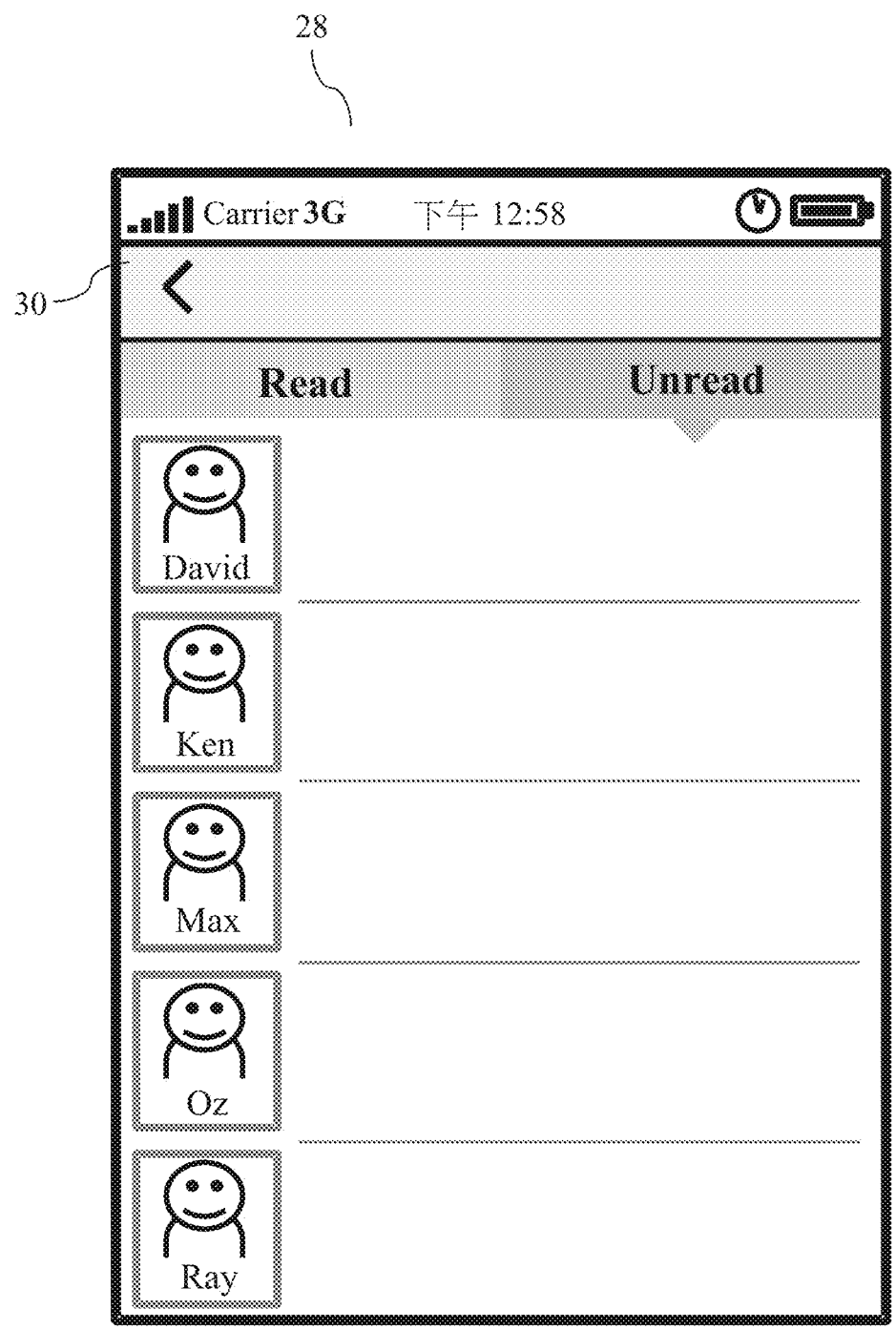
FIG. 5 is a schematic view of the mobile communication device displaying an unread list according to an embodiment of the present invention.

Referring to FIG. 5, there is shown a schematic view of the mobile communication device 28 displaying an unread list according to an embodiment of the present invention. As shown in FIG. 5, in an embodiment of the present invention, after the mobile communication device 28 executes the application 30, the user searches the "unread list" for a specific message (such as a bulletin board message, a chat message, or an article about timeline news.) FIG. 5 shows that members who have not yet read the message include "David", "Ken", "Max", "Oz" and "Ray".

Figure 6:
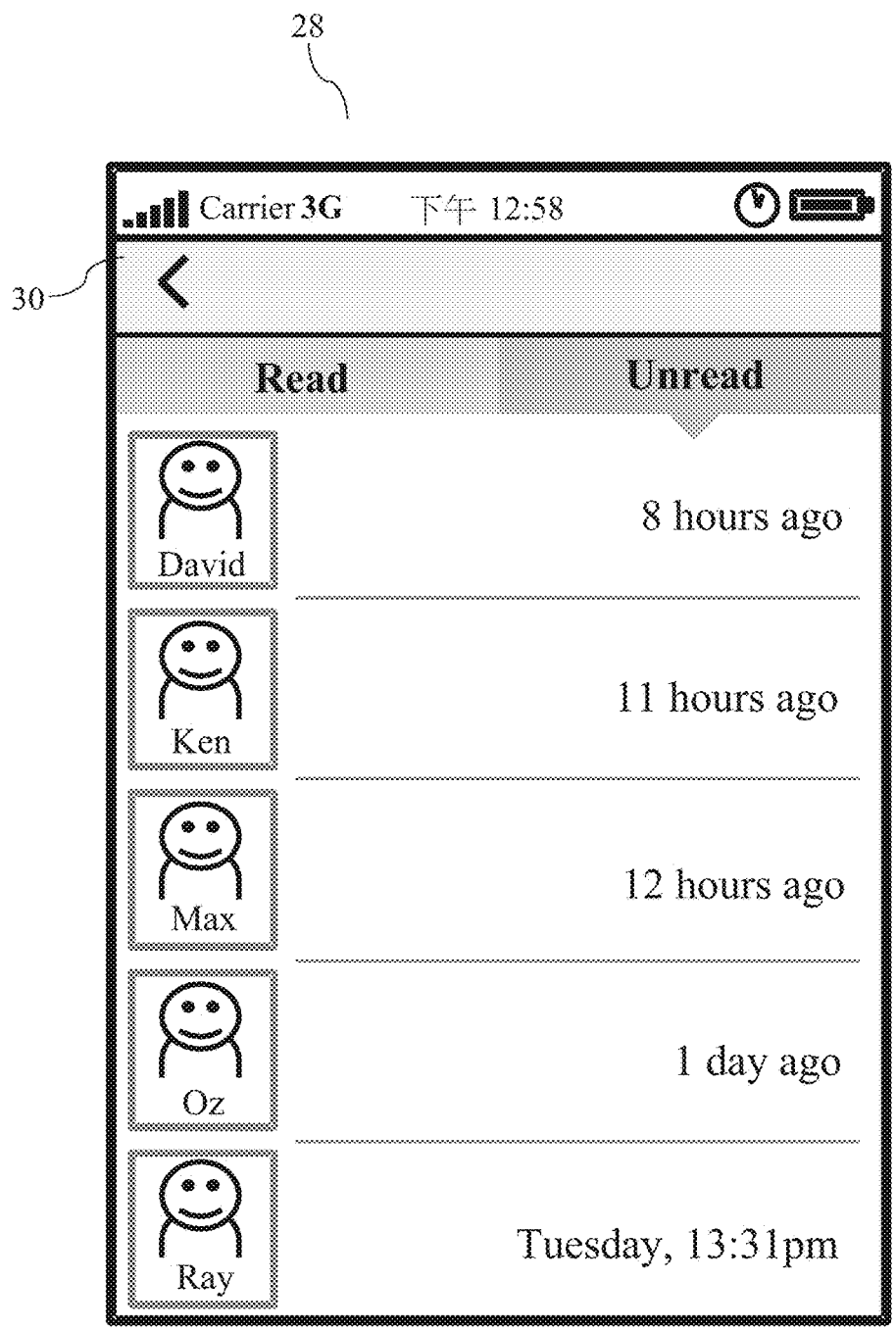
FIG. 6 is a schematic view of the mobile communication device displaying the unread list according to another embodiment of the present invention.

Referring to FIG. 6, there is shown a schematic view of the mobile communication device 28 displaying the unread list according to another embodiment of the present invention. Unlike the previous embodiment (FIG. 4), this embodiment features a timestamp. In an embodiment of the present invention, the timestamps in the unread list indicate the "date and time of the latest login to the system" of the unread members. In another embodiment of the present invention, the timestamps in the unread list indicate the "date and time of the latest entry into the chat room" of the unread members.

Figure 7:
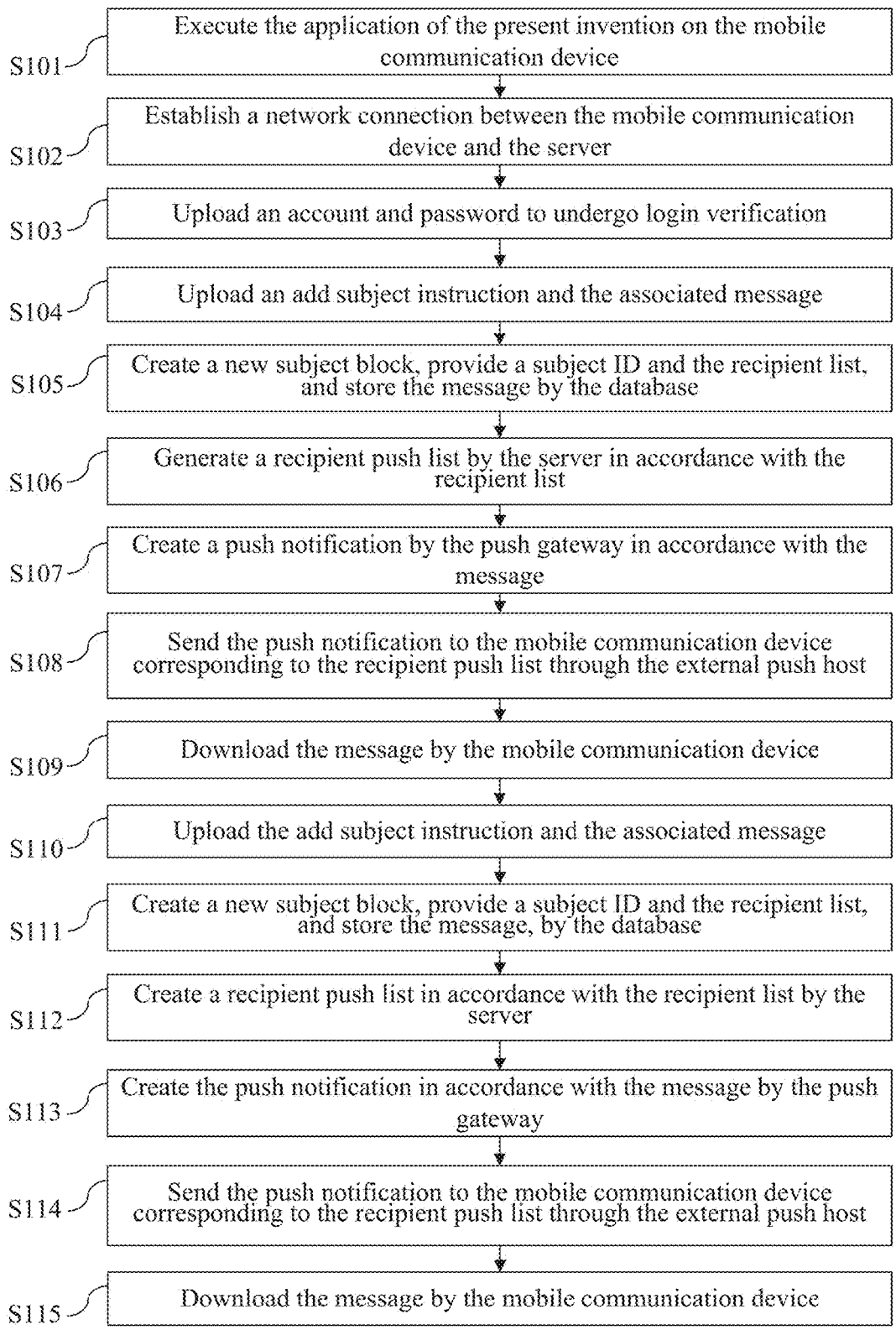
FIG. 7 is a flowchart of operation according to an embodiment of the present invention.
Figure 8:
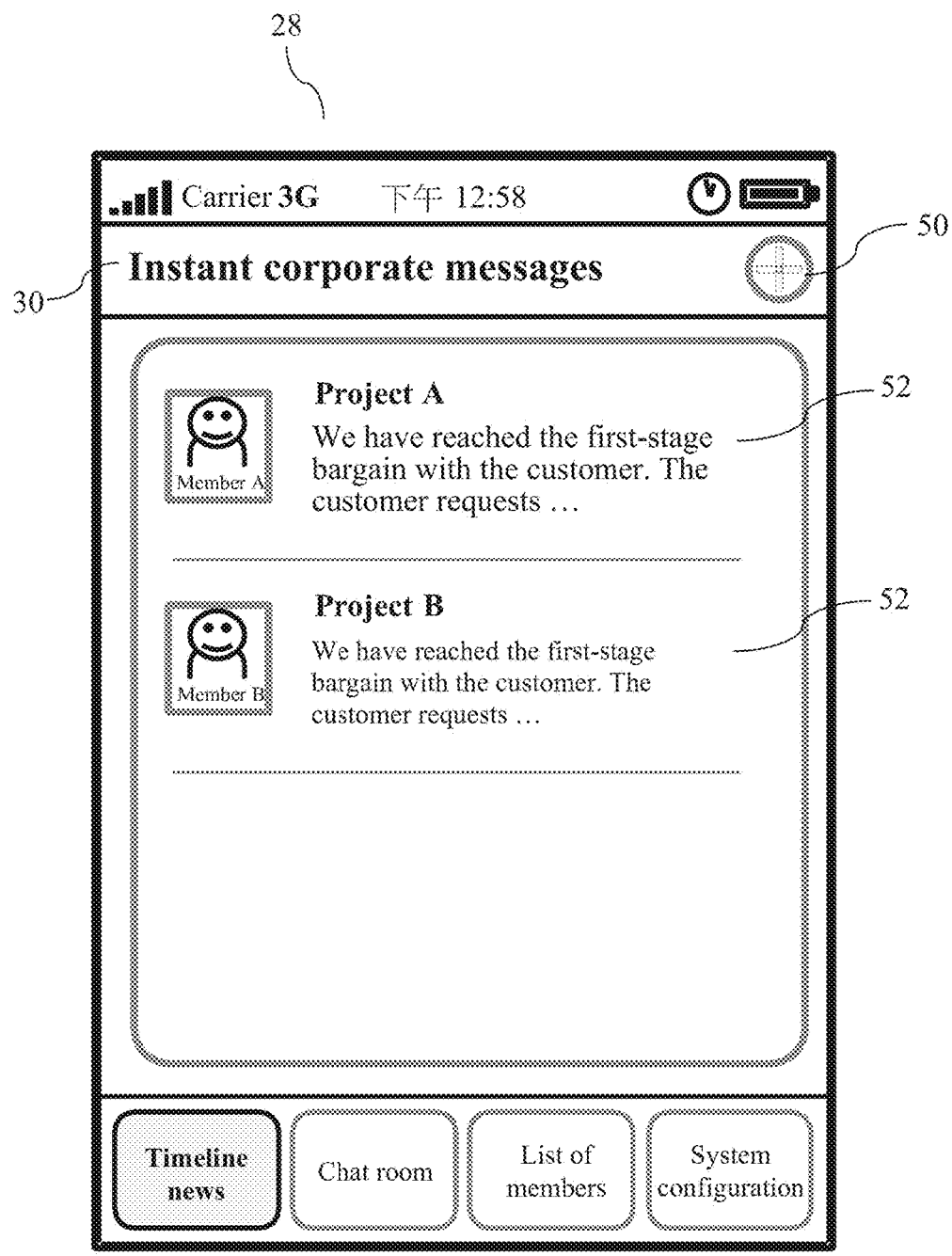
FIG. 8 is a schematic view of a subject summary browsed according to an embodiment of the present invention.

Referring to FIG. 7, there is shown a flowchart of operation according to an embodiment of the present invention. FIG. 7 illustrates the process flow of creating two different subject messages by the same members who take part in the discussion. Referring to FIG. 1, FIG. 2 and FIG. 8, the process flow of the method of the present invention comprises the steps below.

Step S101: execute the application 30 on the mobile communication device 28. The mobile communication device 28 is exemplified by Apple's smartphone iPhone 6 or tablet iPad Air 2.

Step S102: establish a network connection between the mobile communication device 28 and the server 10. After execution of the application 30, the second network communication module 32 of the application 30 establishes a network connection with the first network communication module 12 of the server 10 of the cloud 42. The network connection complies with TCP protocol (including Socket and WebSocket connection), HTTP protocol or HTTPS (i.e., HTTP over SSL) protocol.

Step S103: upload an account and password to undergo login verification. Member A, a user, enters the account and password with the application 30. Afterward, the login module 34 of the mobile communication device 28 uploads the account and password entered by the user to the server 10, and the login verification module 14 performs login verification. In another embodiment of the present invention, the account and password previously entered are buffered in the login module 34 within an effective time period such that execution of the application 30 automatically causes the account and password to be uploaded to the server 10 and then subjected to login verification performed by the login verification module 14.

Step S104: upload an add subject instruction and the associated primary message. The user "member A" clicks on a create new message button 50 and uses the message entering module 40 to enter a new message for discussing with "member B" on "project A." For example, a message content is entered into InputBox (not shown) of the primary message, and then the user selects "member B" (the add subject instruction comprises the recipient list, i.e., "member B") in the directory. Afterward, the user clicks on a "send button" (not shown) such that the message entering module 40 uploads the primary message and the add subject instruction to the server 10 through the second network communication module 32. Hence, the add subject instruction is generated by the message entering module 40.

Step S105: create a new subject block 48, provide a subject ID and the recipient list, and store the primary message by the database 22. After the server 10 receives the uploaded add subject instruction and the associated primary message, the subject management module 16 creates a new subject block 48 (pertaining to "project A") in the database 22 and provides thereto a subject ID which does not repeat so as to store the primary message and the recipient list. For example, as shown in FIG. 2, the subject block 48 has number "0001" (i.e., subject ID), and messages are stored in the container 46 with number "0001."

Step S106: generate a recipient push list by the server 10 in accordance with the recipient list. The first message module 18 compares the database 22 with the recipient list and creates a recipient push list. The recipient push list comprises a push ID associated with the mobile communication device 28.

Step S107: create a push notification by the push gateway 24 in accordance with the message (pertaining to "project A").

Step S108: send the push notification to the mobile communication device 28 corresponding to the recipient push list through the external push host 26. The external push host 26 is exemplified by MPNS, GCM, and APNS, whereas the mobile communication device 28 corresponding to the recipient push list is the mobile communication device 28 of "member B."

Step S109: download the message (pertaining to "project A") by the mobile communication device 28. After the mobile communication device 28 of "member B" receives the push notification (assuming that the member has logged in), a push notification serial number is uploaded through the second network communication module 32, and the full content of a message corresponding to the push notification serial number is downloaded from the server 10.

Step S110: upload the add subject instruction and the associated primary message. The user "member B" clicks on the create new message button 50 and uses the message entering module 40 to enter another new message so as to discuss with "member A" on "project B." For example, after entering a message content into InputBox (not shown) of the primary message, the user ticks off "member A" (the add subject instruction comprises the recipient list, that is, "member A") in the directory and eventually presses a send button (not shown). Then, the message entering module 40 uploads the primary message and the add subject instruction to the server 10 through the second network communication module 32. Hence, the add subject instruction is generated from the message entering module 40.

Step S111: create a new subject block 48, provide a subject ID and the recipient list, and store the primary message, by the database 22. After the server 10 receives the uploaded add subject instruction and the associated primary message, the subject management module 16 creates another new subject block 48 (pertaining to "project B") in the database 22 and provides thereto a unique subject ID so as to store the primary message and the recipient list. For example, referring to FIG. 2, the subject block 48 has number "0002" (i.e., subject ID), and the message is stored in the container 46 with number "0002."

Step S112: create a recipient push list in accordance with the recipient list by the server 10. The first message module 18 searches the database 22 in accordance with the recipient list and creates a recipient push list. The recipient push list comprises a push ID associated with the mobile communication device 28.

Step S113: create the push notification in accordance with the message (pertaining to "project B") by the push gateway 24.

Step S114: send the push notification to the mobile communication device 28 corresponding to the recipient push list through the external push host 26. The external push host 26 is exemplified by MPNS, GCM, and APNS. The mobile communication device 28 corresponding to the recipient push list is the mobile communication device 28 of "member A."

Step S115: download the message by the mobile communication device 28. After the mobile communication device 28 of "member A" receives the push notification and undergoes login verification, the mobile communication device 28 uploads a push notification serial number and downloads the full content of the message (pertaining to "project B") corresponding to the push notification serial number from the server 10.

Figure 9:
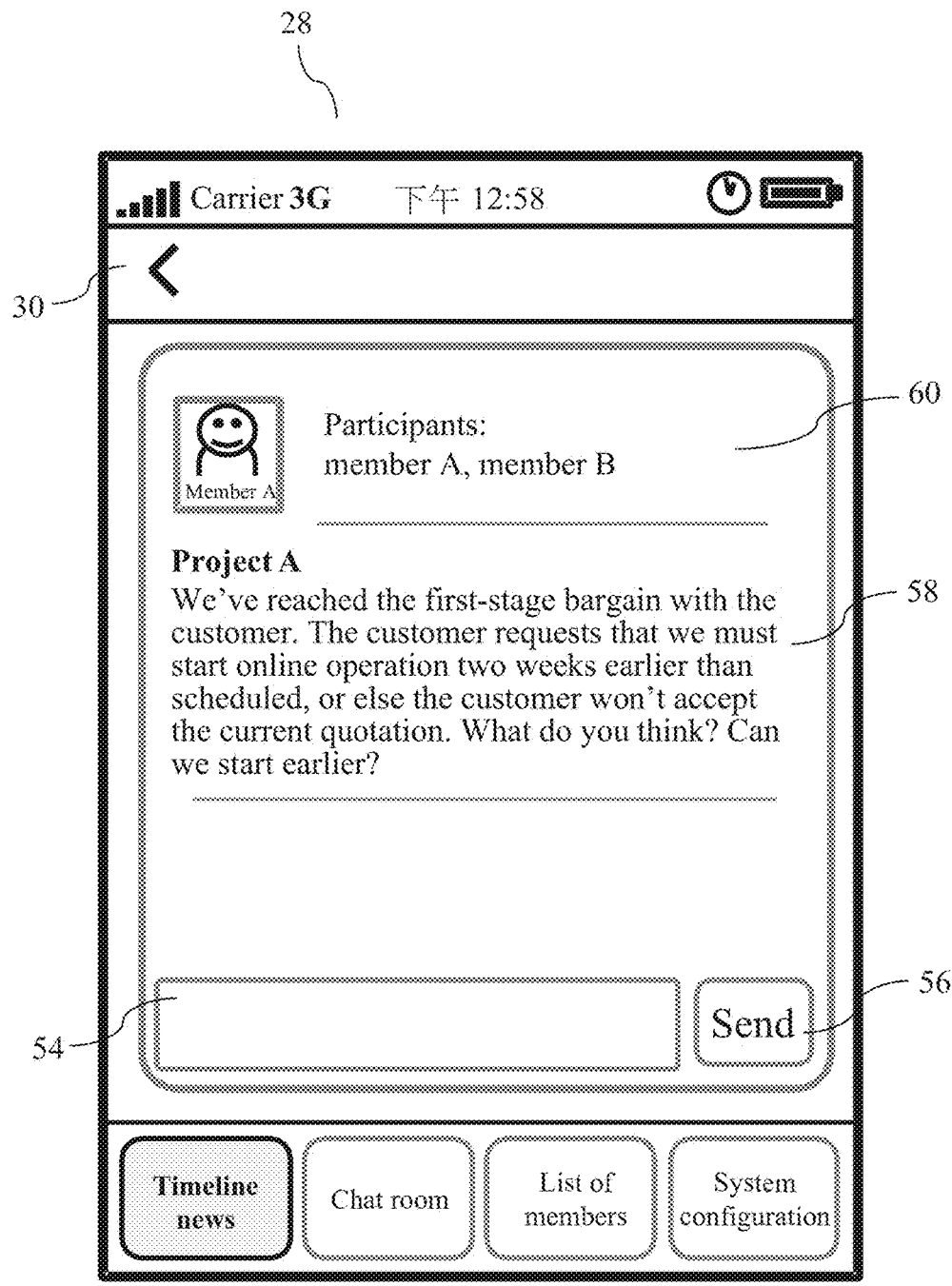
FIG. 9 is a schematic view 1 of subject content according to an embodiment of the present invention.
Figure 10:
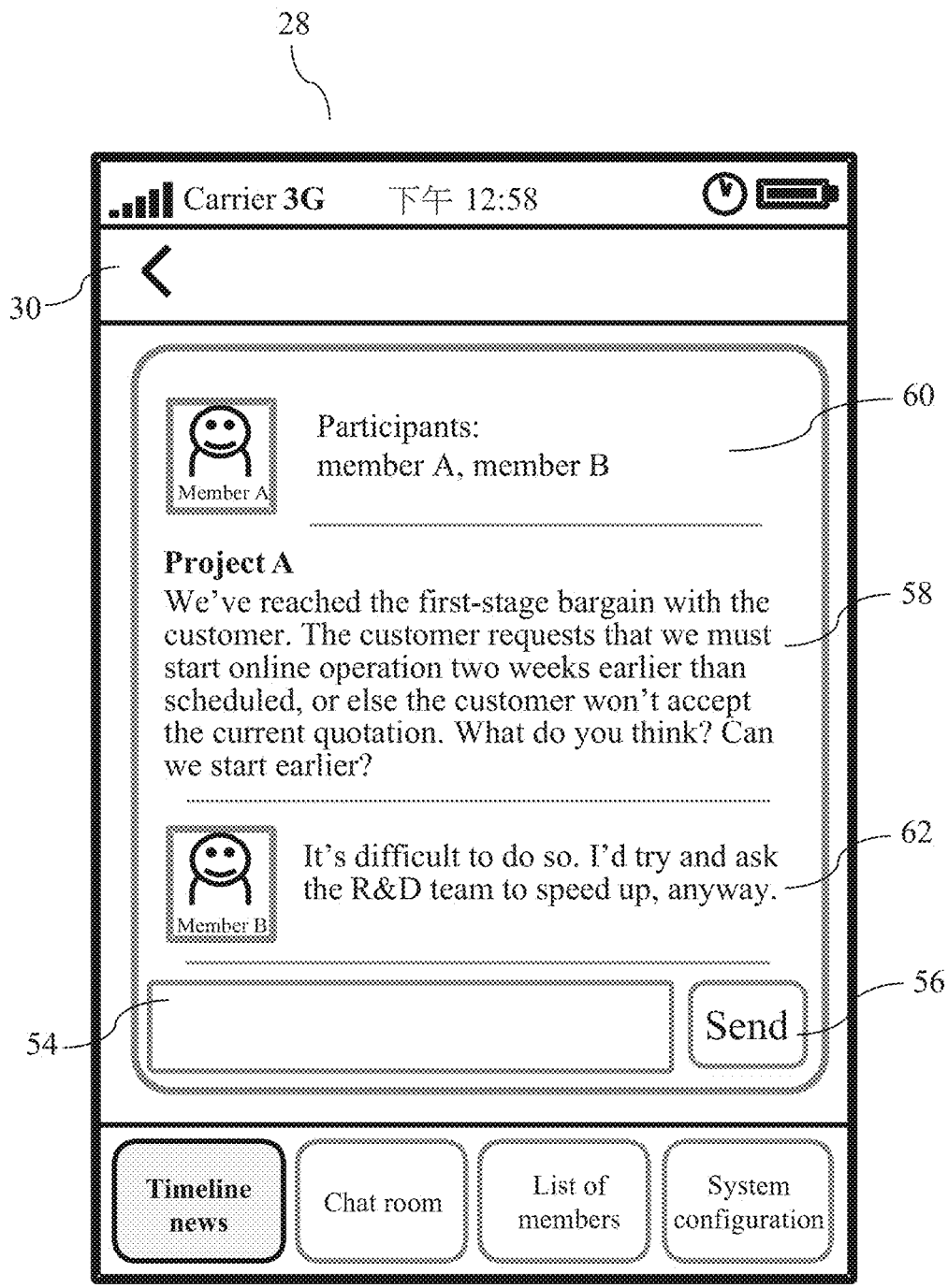
FIG. 10 is a schematic view 2 of subject content according to an embodiment of the present invention.

After the add subject instruction and the associated primary message have been uploaded in step S104 and step S110, both step S105 and step S111 entail creating different subject blocks 48 in the database 22 by the subject management module 16 to record different discussion messages ("project A" and "project B"), whereas the application 30 at the client end browses a message summary 52 according to the subject, as shown in FIG. 8, such that all the different project discussion messages are not stored together whenever the participants are the same and thus are difficult to distinguish when being browsed as disclosed in citation 4. To see the full content of a message, the user clicks on the message summary 52 so that a primary message full content 58 (shown in FIG. 9) is displayed. To give a reply, the user enters the content thereof into a message InputBox 54 below and then presses a send button 56 so as to generate a reply subject instruction and upload the reply message to the server 10. After the reply message is uploaded, the frame is updated as shown in FIG. 10 and characterized by a reply message full content 62 not shown in FIG. 9.

In various embodiments of the present invention, program instructions executed by a computer can implement every block in the flowchart, a combination of the blocks in the flowchart, and the steps in every embodiment. The program instructions are provided to a processor so as to be executed by the processor to thereby produce resources required for a machine or coordinated operation of hardware and software; hence, the instructions are executed on the processor to thereby produce elements required for carrying out actions or technical effects specified by the blocks in the flowchart. Different combinations of program instructions also allow simultaneous execution of at least some operating steps specified in the blocks in the flowchart, whereas the technical solutions indicated by the first through fifth program instructions of an application may vary from embodiment to embodiment. Furthermore, it is also practicable that some of the steps are executed on one or more processors, for example, in the case of a servo computer system of multiple processors or in the case of coordinated operation of a microprocessor in a mobile communication device and a peripheral interface processor. Moreover, in the flowchart, at least one block or a combination of blocks may be performed along with the other block or the other combination of blocks simultaneously or performed in a sequence different from its specified counterpart, without departing from the spirit and scope of the present invention.

Therefore, the blocks in the flowchart of the present invention support a combination of elements required for performing specified actions or technical solutions, a combination of steps required for performing specified actions or technical solutions, and program instruction elements required for performing specified actions or technical solutions. What is also understandable is that the specified actions or technical solutions are effectuated by a combination of blocks in the flowchart as well as each block in the flowchart of the present invention through the coordinated operation of a special-purpose hardware-style system or special-purpose hardware, and program instructions.

In conclusion, the present invention provides a cloud system and method of an enterprise mobile message and a mobile communication device for use in accessing the cloud to thereby overcome drawbacks of the prior art, for example, discussion messages pertaining to different subjects are recorded miscellaneously whenever discussion participants are the same. Hence, the present invention allows messages to be browsed according to subject inquiry, reduces the time taken to identify message record, effectuates one-time I/O access to thereby load the data in the same subject block, and enhances the efficiency of operation of the database 22 and the server 10 greatly.

The technical solution of the present invention is disclosed above by preferred embodiments. However, the preferred embodiments are not restrictive of the present invention. Slight changes and modifications can be made by persons skilled in the art to the aforesaid embodiments without departing from the spirit of the present invention and shall still fall within the scope of the present invention. Accordingly, the legal protection for the present invention should be defined by the appended claims.

What is claimed is:

1. A system of an enterprise mobile message for storing messages in separate blocks in a database in accordance with subjects, comprising:
   the database for storing therein a plurality of subject blocks and a plurality of member information sets, wherein the subject blocks each comprises a subject ID and a primary message associated with the subject ID;
   a server for accessing the database, comprising:
      a first network communication module for establishing a network connection with a mobile communication device associated with one of the member information sets;
      a login verification module for verifying whether the mobile communication device has established a network connection with the server; and
      a subject management module for receiving a reply message and a reply subject instruction associated with the subject ID and uploaded from the mobile communication device so as to store the reply message in the subject block corresponding to the subject ID and associate the reply message with the primary message; and
   a push gateway for creating a push notification in accordance with the primary message or the reply message and sending the push notification to the mobile communication device corresponding to the associated member information sets through an external push host,
   wherein a cloud comprises the database, the server, and the push gateway,
   wherein the mobile communication device comprises at least one processor and a screen,
   wherein the processor executes a plurality of program instructions, the program instructions comprising:
      a first program instruction for instructing the mobile communication device to establish the network connection with the server and thereby undergo login verification;
      a second program instruction for instructing the mobile communication device to download a message content of the primary message corresponding to a push notification serial number from the server after receiving the push notification;
      a third program instruction for instructing the mobile communication device to display messages according to the subject ID and display the primary message associated with the subject ID on the screen, wherein the third program instruction instructs the mobile communication device to download and display an unread list in response to an unread list query instruction,
      wherein the third program instruction further instructs the mobile communication device to display a timestamp corresponding to the member information sets while displaying the unread list, and
      wherein the timestamp indicates one of a date and time of a latest login to the system and a date and time of a latest entry into a chat room; and
      a fourth program instruction for instructing the mobile communication device to receive input of the reply message, generate the reply subject instruction associated with the subject ID, and upload the reply message and the reply subject instruction to the server, and
   wherein the primary message is stored in a container configured to store contents of the container in any of the following plurality of data formats: text, video, audio, graphic, picture, URL, streaming and e-voting,
   wherein the primary message and the reply message of the same subject ID are stored physically at adjacent locations in the database so that, in order for the database to be loaded, a one-time data access is performed to thereby load the entire data within the subject block according to the subject ID.

2. The system of claim 1, wherein the server comprises a reading record management module for creating a read list or the unread list associated with the member information sets in accordance with a read/unread information set associated with the primary message or the reply message.

3. The system of claim 2, wherein the read/unread information set requires recording association between the member information sets and a read/unread state of the primary message or the reply message.

4. The system of claim 1, wherein the third program instruction instructs the mobile communication device to upload a read state in response to a reading instruction of the primary message.

5. The system of claim 1, wherein the third program instruction instructs the mobile communication device to download and display a read list in response to a read list query instruction of the primary message.

6. The system of claim 1, wherein the subject blocks each comprises a recipient list associated with the member information sets.

7. The system of claim 6, wherein the reply subject instruction comprises the recipient list.

8. The system of claim 7, wherein the subject management module overwrites the recipient list of the subject block with the recipient list of the reply subject instruction.

9. The system of claim 6, wherein the server comprises a first message module for creating a recipient push list in accordance with the recipient list, and the recipient push list comprises at least one push ID associated with the mobile communication device.

10. The system of claim 1, wherein the subject management module receives the primary message and an add subject instruction uploaded from the mobile communication device and thereby creates a subject block in the database.

11. The system of claim 10, wherein the add subject instruction comprises a recipient list, wherein the subject management module provides the subject ID and the recipient list and stores the primary message in the subject block.

12. The system of claim 1, wherein, in response to the reply subject instruction, the subject management module creates a second level block within the subject block and provides a subject second level ID to thereby store the reply message.

13. A system of an enterprise mobile message for storing messages in separate blocks in a database in accordance with subjects, comprising:
the database for storing therein a plurality of subject blocks and a plurality of member information sets, wherein the subject blocks each comprises a subject ID, a primary message associated with the subject ID, and at least one read/unread information set, wherein the read/unread information set requires recording association between the member information set and a read/unread state of the primary message;
a server for accessing the database, comprising:
a first network communication module for establishing a network connection with a mobile communication device associated with one of the member information sets;
a subject management module for receiving the primary message and an add subject instruction uploaded from the mobile communication device to thereby create the subject block in the database, provide the subject ID, and store the primary message in the subject block; and
a reading record management module for comparing the member information sets in accordance with the read/unread information set to thereby create a read list or an unread list; and
a push gateway for creating a push notification in accordance with the primary message and sending the push notification to the mobile communication device corresponding to the associated member information sets through an external push host,
wherein a cloud comprises the database, the server, and the push gateway,
wherein the mobile communication device comprises at least one processor and a screen,
wherein the processor executes a plurality of program instructions, the program instructions comprising:
a first program instruction for instructing the mobile communication device to download the primary message corresponding to a push notification serial number from the server after receiving the push notification; and
a second program instruction for instructing the mobile communication device to display messages according to the subject ID, display the primary message associated with the subject ID on the screen, and download and display the unread list in response to an unread list query instruction, or download and display the read list in response to a read list query instruction,
wherein the second program instruction instructs the mobile communication device to display a timestamp corresponding to the member information sets while displaying the read list or the unread list, and
wherein the timestamp indicates one of a date and time of a latest login to the system and a date and time of a latest entry into a chat room; and
a third program instruction for instructing the mobile communication device to receive the primary message input, generate the add subject instruction, and upload the primary message and the add subject instruction to the serve, and wherein the primary message is stored in a container configured to store contents of the container in any of the following plurality of data formats: text, video, audio, graphic, picture, URL, streaming and e-voting,
wherein the subject management module receives a reply message and a reply subject instruction associated with the subject ID and uploaded from the mobile communication device so as to store the reply message in the subject block corresponding to the subject ID and associate the reply message with the primary message,
wherein the primary message and the reply message of the same subject ID are stored physically at adjacent locations in the database so that, in order for the database to be loaded, a one-time data access is performed to thereby load the entire data within the subject block according to the subject ID.

14. The system of claim 13, wherein the add subject instruction comprises a recipient list associated with the member information sets.

15. The system of claim 14, wherein the subject management module provides the recipient list.

16. The system of claim 14, wherein the server comprises a first message module for creating a recipient push list in accordance with the recipient list, and the recipient push list comprises at least one push ID associated with the mobile communication device.

17. A method of an enterprise mobile message for storing messages in separate blocks in a database in accordance with subjects, applicable to a cloud comprising the database, a server, and a push gateway,
wherein a mobile communication device comprises at least one processor and a screen, and
wherein the processor executes a plurality of program instructions, the program instructions comprising:
a first program instruction for instructing the mobile communication device to establish a network connection with the server and thereby undergo login verification;
a second program instruction for instructing the mobile communication device to download a message content of a primary message corresponding to a push notification serial number from the server after receiving a push notification;
a third program instruction for instructing the mobile communication device to display messages according to a subject ID and display the primary message associated with the subject ID on the screen,
wherein the third program instruction downloads and displays an unread list in response to an unread list query instruction, and the unread list is created by the server in accordance with a comparison between a read/unread information set and the member information sets,
wherein the third program instruction instructs the mobile communication device to display a timestamp corresponding to the member information sets while displaying the unread list, and
wherein the timestamp indicates one of a date and time of a latest login to a system and a date and time of a latest entry into a chat room; and
a fourth program instruction for instructing the mobile communication device to receive input of a reply message, generate a reply subject instruction associated with the subject ID, and upload the reply message and the reply subject instruction to the server, the method comprising the steps of:

storing a plurality of subject blocks and a plurality of member information sets in the database, wherein the subject blocks each comprises the subject ID and the primary message associated with the subject ID;

establishing the network connection between the server and the mobile communication device associated with one of the member information sets so as for the mobile communication device to undergo login verification;

receiving by the server the reply message and the reply subject instruction uploaded from the mobile communication device and associated with the subject ID, storing the reply message in the subject block, and associating the reply message with the primary message; and creating the push notification in accordance with the primary message or the reply message by the push gateway and sending the push notification to the mobile communication device through a push host, wherein the primary message is stored in a container configured to store contents of the container in any of the following plurality of data formats: text, video, audio, graphic, picture, URL, streaming and e-voting, wherein the primary message and the reply message of the same subject ID are stored physically at adjacent locations in the database so that, in order for the database to be loaded, a one-time data access is performed to thereby load the entire data within the subject block according to the subject ID.

18. The method of claim 17, further comprising receiving by the server the primary message and an add subject instruction uploaded from the mobile communication device, wherein the add subject instruction comprises a recipient list.

19. The method of claim 18, further comprising creating the subject block in the database, providing the subject ID and the recipient list, and storing the primary message.

20. The method of claim 18, further comprising creating by the server a recipient push list in accordance with the recipient list, wherein the recipient push list comprises a push ID associated with the mobile communication device.

21. The method of claim 17, further comprising creating by the server a second level block in the subject block in response to the reply subject instruction and providing a subject second level ID so as to store the reply message.

22. The method of claim 17, further comprising storing the read/unread information set in the database, wherein the read/unread information set requires recording association between the member information set and a read/unread state of the primary message or the reply message.

23. The method of claim 22, further comprising creating a read list in accordance with the read/unread information set associated with the member information sets.

24. The method of claim 17, wherein the program instructions further include a fifth program instruction for instructing the mobile communication device to receive the primary message input, generate an add subject instruction, and upload the primary message and the add subject instruction to the server.

25. The method of claim 17, wherein the third program instruction instructs the mobile communication device to download and display a read list in response to a read list query instruction.

26. The method of claim 18, wherein the reply subject instruction comprises the recipient list.

27. The method of claim 26, further comprising overwriting the recipient list of the add subject instruction with the recipient list of the reply message.

28. A method of an enterprise mobile message for storing messages in separate blocks in a database in accordance with subjects, applicable to a mobile communication device for use in accessing a cloud, with the cloud comprising the database, a server, and a push gateway, wherein the database stores therein a plurality of subject blocks, a plurality of member information sets, and an unread list, wherein the subject blocks each comprises a subject ID and a primary message associated with the subject ID, wherein the unread list records the member information sets pertaining to members who have not read the primary message content, wherein the mobile communication device comprises at least one processor and a screen, wherein the processor executes a plurality of program instructions, the program instructions comprising:

a first program instruction for instructing the mobile communication device to establish a network connection with the server and thereby undergo login verification;

a second program instruction for instructing the mobile communication device to download the primary message of the subject block from the server according to a push notification;

a third program instruction for instructing the mobile communication device to display messages according to the subject ID and display the primary message associated with the subject ID on the screen, wherein the third program instruction downloads and displays the unread list in response to an unread list query instruction, wherein the third program instruction instructs the mobile communication device to display a timestamp corresponding to the member information sets while displaying the unread list, and wherein the timestamp indicates one of a date and time of a latest login to a system and a date and time of a latest entry into a chat room; and a fourth program instruction for instructing the mobile communication device to receive input of a reply message, generate a reply subject instruction associated with the subject ID, and upload the reply message and the reply subject instruction to the server, wherein the server associates the reply message with the primary message within the subject block according to the reply subject instruction, wherein the primary message is stored in a container configured to store contents of the container in any of the following plurality of data formats: text, video, audio, graphic, picture, URL, streaming and e-voting, wherein the primary message and the reply message of the same subject ID are stored physically at adjacent locations in the database so that, in order for the database to be loaded, a one-time data access is performed to thereby load the entire data within the subject block according to the subject ID.

29. The method of claim 28, wherein the program instructions further include a fifth program instruction for instructing the mobile communication device to receive the primary message input, generate an add subject instruction, and upload the primary message and the add subject instruction to the server.

30. The method of claim 28, wherein the third program instruction instructs the mobile communication device to download and display a read list in response to a read list query instruction.

31. The method of claim 29, wherein the add subject instruction comprises a recipient list.

32. The method of claim 31, wherein the reply subject instruction comprises the recipient list.

33. The method of claim 32, further comprising overwriting the recipient list of the add subject instruction with the recipient list of the reply message.

34. A method of an enterprise mobile message for storing messages in separate blocks in a database in accordance with subjects, applicable to a mobile communication device for use in accessing a cloud comprising the database, a server, and a push gateway, wherein the database stores therein a plurality of subject blocks and a plurality of member information sets, wherein the subject blocks each comprises a subject ID, a primary message associated with the subject ID, and at least one read/unread information set, wherein the read/unread information set requires recording association between the member information set and a read/unread state of the primary message, wherein the mobile communication device comprises at least one processor and a screen, wherein the processor executes a plurality of program instructions, the program instructions comprising:
- a first program instruction for instructing the mobile communication device to establish a network connection with the server and thereby undergo login verification;
- a second program instruction for instructing the mobile communication device to receive the primary message input, generate an add subject instruction, and upload the primary message and the add subject instruction to the server;
- a third program instruction for instructing the mobile communication device to download and display an unread list in response to an unread list query instruction, or download and display a read list in response to a read list query instruction;
- a fourth program instruction for instructing the mobile communication device to receive input of a reply message, generate a reply subject instruction associated with the subject ID, and upload the reply message and the reply subject instruction to the server, wherein the server associates the reply message with the primary message within the subject block according to the reply subject instruction,
  - wherein the unread list or the read list is created in accordance with comparison between the read/unread information set and the member information sets,
  - wherein the third program instruction instructs the mobile communication device to display a timestamp corresponding to the member information sets while displaying the unread list, and
  - wherein the timestamp indicates one of a date and time of a latest login to a system and a date and time of a latest entry into a chat room, and
- wherein the primary message is stored in a container configured to store contents of the container in any of the following plurality of data formats: text, video, audio, graphic, picture, URL, streaming and e-voting.

35. The method of claim 34, wherein the add subject instruction comprises a recipient list associated with the member information sets.

36. The method of claim 34, wherein the server receives the add subject instruction and the primary message, creates the subject block in the database, provides the subject ID, and stores the primary message in the subject block.

* * * * *